Feb. 9, 1932.  C. J. ROOD  1,844,337
FRICTION CLUTCH
Filed Oct. 4, 1929   2 Sheets-Sheet 1

Inventor
Clarence J. Rood

By Clarence A. O'Brien
Attorney

Feb. 9, 1932. C. J. ROOD 1,844,337
FRICTION CLUTCH
Filed Oct. 4, 1929   2 Sheets-Sheet 2
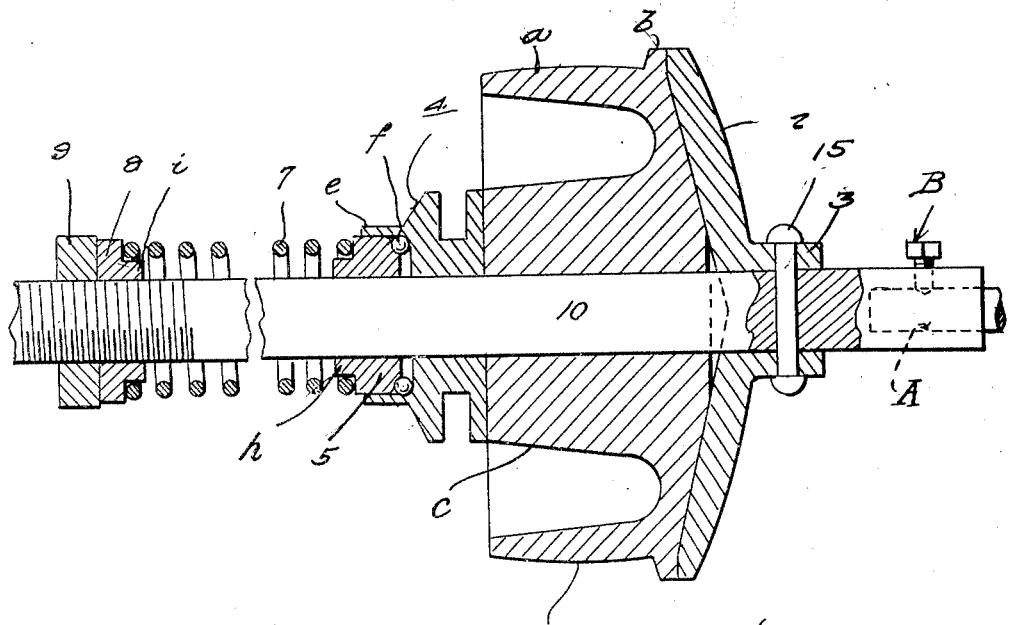
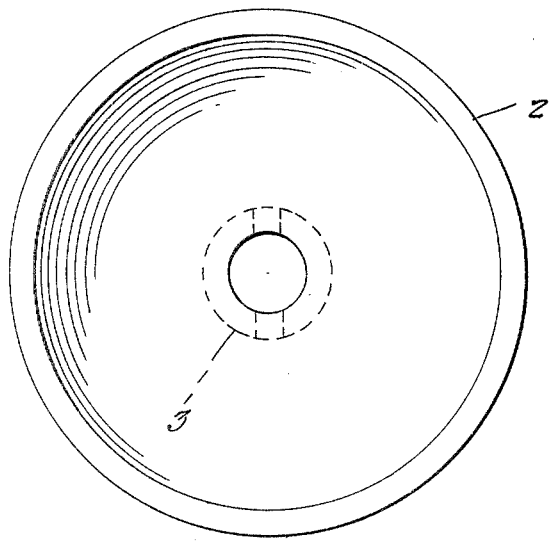
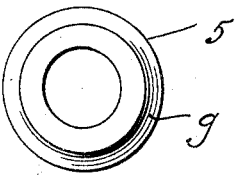
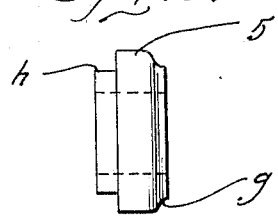
Inventor
Clarence J. Rood
By Clarence A. O'Brien
Attorney Patented Feb. 9, 1932

1,844,337

UNITED STATES PATENT OFFICE

CLARENCE J. ROOD, OF FERGUS FALLS, MINNESOTA

FRICTION CLUTCH

Application filed October 4, 1929. Serial No. 397,349.

The present invention relates to a friction clutch and has for its prime object to provide improvements in the structure shown in Sholberg's Patent #1,577,496, said improvements embodyig simplicity in construction, durability, convenience, minimizing friction, enhancing reliability and efficiency and permitting more economical manufacture.

A clutch such as is disclosed herein may be used to advantage on cream separators and other similar machinery.

With the above and numerous other objects in view, as will appear as the description proceeds the invention resides in certain novel features of construction, and in the combination and arrangement of parts as will be hereinafter more fully described and claimed.

In the drawings:

Figure 2 is a longitudinal section therethrough.

Figure 3 is an elevation of the driven disc.

Figure 4 is an elevation of the inner cone and spring support.

Figure 5 is another elevation thereof, taken at right angles to that shown in Figure 4.

Figure 1:
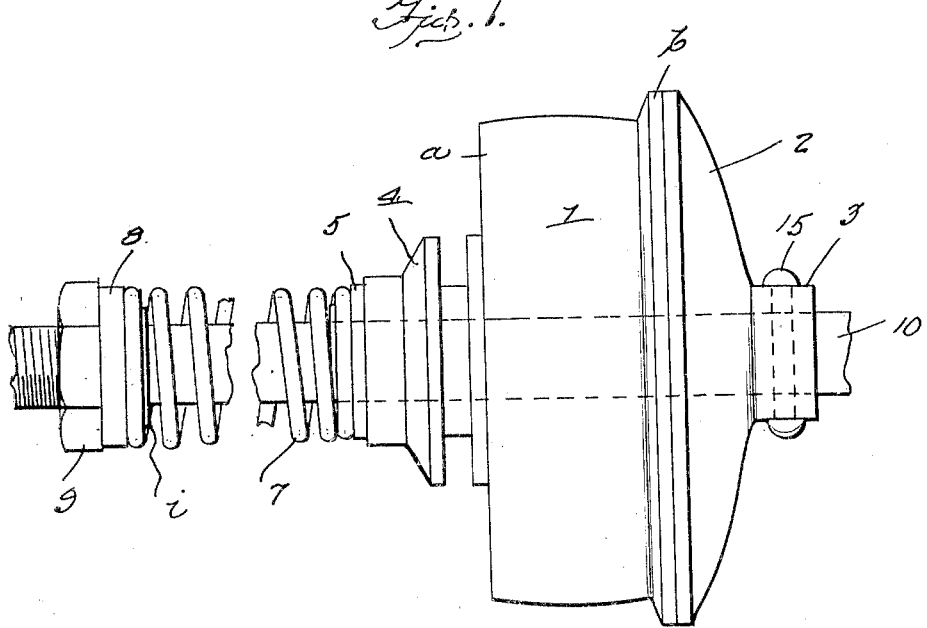
Figure 1 is a side elevation of the structures embodying the features of my invention.
Figure 6:
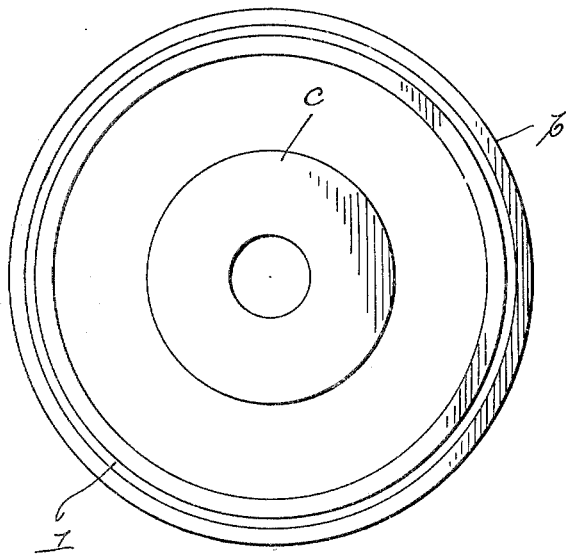
Figure 6 is an elevation of the flange pulley and driving disc and pressure collar support and Figure 7 is an elevation of the driving pressure collar and clutch release.
Figure 7:
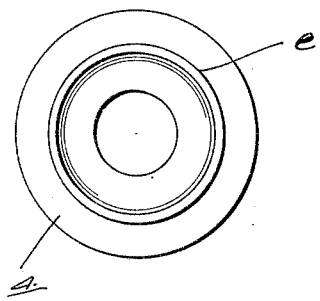

Referring to the drawings in detail, it will be seen that the numeral 10 denotes a shaft having fixed thereon a driven disc 2, which is provided with a collar 3, pinned to the shaft 10 as at 15. The shaft 10 projects beyond the disc 2 and is provided with a socket A for the purpose of coupling a second shaft (not shown) thereto, said shafts being rigidly secured together through the medium of the set screw B threaded through the wall of the socket. The second shaft may be that of a cream separator.

The flange pulley and driving disc and pressure collar support 1 is rotatably mounted on the shaft 10. The flange is denoted by the letter $a$, the disc by the letter $b$, and the pressure collar support by the letter $c$. The numeral 4 denotes a driving pressure collar and clutch release which is disposed upon the shaft 10 to abut the support $c$. The numeral 5 denotes an inner cone and spring support, which extends into the sleeve of the member 4 and has ball bearings $f$ interposed between the member 4 and itself, and the bearings $f$ being located in the annular groove $g$.

A reduced extension $h$, extends from the member 5 and a spring 7 of the coil type has one end disposed thereover. The numeral 8 denotes a spring tightener and support on the shaft 10 and has one end reduced as at $i$, so that the other end of the spring 7 may fit thereover.

A nut 9 is threaded on the shaft 10 for tightening the tension of the spring 7 as may be desired.

It is thought that the construction, operation, utility and advantages of the improved structure will be quite apparent to those skilled in this art, without a more detailed description thereof.

The present embodiment of the invention has been disclosed in considerable detail, merely for the purposes of exemplification, since in actual practice it attains the features of advantage enumerated as desirable in the statement of the invention and the above description.

It will be apparent that changes in the details of construction and in the combination and arrangement of parts may be resorted to, without departing from the spirit or scope of the invention as hereinafter claimed or sacrificing any of its advantages.

What is claimed as new is:

In combination, a shaft, a conical clutch disk rigidly mounted on the shaft, a companion conical clutch rotor rotatably mounted on the shaft, a screw threaded portion on the shaft, a spring tightener structure cooperating with the screw threaded portion, a clutch collar rotatable on the shaft for abutting the clutch rotor, a ball bearing spring carrier rotatable in a recess on the clutch collar, and a helical spring on the shaft expanding against said spring tightener structure and said spring carrier for frictionally engaging the clutch rotor with the clutch disk, said clutch rotor comprising a hollow cylinder having its closed end portion frusto-conical, an axially and concentrically projected hub portion formed interiorly on the said closed end, said end and the hub being longitudinally bored to receive rotatably the said shaft, said hub portion being projected to meet the same plane as the edges of the open end of the cylinder and to abut the contiguous end of the clutch collar.

In testimony whereof I affix my signature.

CLARENCE J. ROOD.